United States Patent
Huang et al.

(10) Patent No.: US 10,577,267 B2
(45) Date of Patent: Mar. 3, 2020

(54) FAST BIOFILM FORMATION METHOD FOR ORGANIC FILLER DURING TREATMENT OF SEWAGE WITH LOW C/N RATIO

(71) Applicant: NANJING UNIVERSITY, Nanjing (CN)

(72) Inventors: Hui Huang, Nanjing (CN); Qing Wang, Nanjing (CN); Hong-qiang Ren, Nanjing (CN)

( * ) Notice: Subject to any disclaimer, the term of this patent is extended or adjusted under 35 U.S.C. 154(b) by 296 days.

(21) Appl. No.: 15/632,358

(22) Filed: Jun. 25, 2017

(65) Prior Publication Data

US 2018/0141843 A1 May 24, 2018

(30) Foreign Application Priority Data

Nov. 22, 2016 (CN) .......................... 2016 1 1046007

(51) Int. Cl.
| | | |
|---|---|---|
| *C02F 3/34* | (2006.01) | |
| *C02F 3/10* | (2006.01) | |
| *C02F 3/00* | (2006.01) | |
| *C02F 3/30* | (2006.01) | |
| *C02F 3/02* | (2006.01) | |
| C02F 101/16 | (2006.01) | |
| C02F 103/34 | (2006.01) | |
| C02F 103/36 | (2006.01) | |

(52) U.S. Cl.
CPC ................ *C02F 3/301* (2013.01); *C02F 3/02* (2013.01); *C02F 3/101* (2013.01); *C02F 3/106* (2013.01); *C02F 3/107* (2013.01); *C02F 3/34* (2013.01); *C02F 3/00* (2013.01); *C02F 2101/16* (2013.01); *C02F 2103/343* (2013.01); *C02F 2103/36* (2013.01); *C02F 2203/004* (2013.01); *C02F 2301/00* (2013.01); *C02F 2305/06* (2013.01); *Y02W 10/15* (2015.05)

(58) Field of Classification Search
CPC .......... C02F 3/101; C02F 3/106; C02F 3/107; C02F 3/301; C02F 3/34; C02F 2101/16; C02F 2103/343; C02F 2103/36; C02F 2203/004

See application file for complete search history.

*Primary Examiner* — Patrick Orme
(74) *Attorney, Agent, or Firm* — W&K IP

(57) ABSTRACT

The invention discloses a fast biofilm formation method for an organic filler during treatment of sewage with a low C/N ratio, and belongs to the field of biofilm process for sewage treatment. The invention improves the effect of biofilm culturing by changing the micro-interface acting force of the filler and accelerating the attachment and colonization of microorganisms on the filler through increase of bacterial quorum-sensing molecules. As compared with a conventional biofilm culturing method, in the invention the biofilm culturing is rapid and operated conveniently, has strong practicality, and is a fast biofilm formation method for an organic filler, which is adapted for treatment of sewage with a low C/N ratio under an aerobic, anoxic or anaerobic condition.

3 Claims, No Drawings

FAST BIOFILM FORMATION METHOD FOR ORGANIC FILLER DURING TREATMENT OF SEWAGE WITH LOW C/N RATIO

CROSS-REFERENCE TO RELATED APPLICATIONS

This application claims priority to Chinese Patent Application No. 201611046007.2 with a filing date of Nov. 22, 2016. The content of the aforementioned applications, including any intervening amendments thereto, are incorporated herein by reference.

TECHNICAL FIELD

The invention belongs to the technical field of biofilm process for sewage treatment, and in particular relates to a fast biofilm formation method for an organic filler during treatment of sewage with a low C/N ratio.

BACKGROUND OF THE PRESENT INVENTION

With the continuous progress of industrialization process, the discharge of nitrogen-containing sewage is increased rapidly in China, which brings a great calamity to the environment, and particularly the treatment of some sewage with high ammonia nitrogen and low C/N ratio as generated in the industrial production gets wide attention from people. It is difficult for a conventional activated sludge process to meet the discharge standard during treatment of such sewage due to lack of carbon source. The biofilm process for sewage treatment forms a layer of active biofilm on a carrier after the sewage contained in the reactor comes into contact with the filler. The microorganisms mass-reproduced on the biofilm absorb and degrade the pollutants to achieve an effect of purifying the sewage, and since the biofilm has a strong tolerance, the biofilm process has a wide application prospect in treatment of sewage with a low C/N ratio. However, the biofilm culturing speed of the biofilm process still needs to be improved. Currently, the biofilm culturing manner mainly includes a "aerating process", a "cycling process", a "naturally biofilm culturing process", and the like. The desired biofilm culturing time for each of these kinds of biofilm culturing processes is long, which often spends a time of 1-2 months. Chinese invention patent "biofilm culturing process on carrier filler of moving bed biofilm reactor" (publication No. 05565480A) performs water discharging and suspending of ion exchange sewage for a moving bed biofilm reactor at the same time to conduct a dynamic culture, and backflows the activated sludge. Such a method needs to control the sludge concentration and is inconvenient in operation, and the dynamic culture causes unstable running. Patent named as "Fast Biofilm Culturing Process of Microorganisms on Suspended Filler" (publication No. 05565480A) needs to run for 7-25 days to complete the biofilm culturing, and thus the time of biofilm culturing is still too long.

In the other hand, with the development of the industry of polymer synthetic material, a large number of organic polymer fillers have come out and applied, and become one of the most promising biofilm fillers. The types of commonly-used organic filler materials include polyethylene terephthalate (PET), polyvinyl acetal (PVF), polyacrylonitrile (PAN), polyamide (PA), polyethylene (PE), polypropylene (PP), polyvinyl chloride (PVC), polystyrene (PS) and the like. Therefore, it is of great practical significance to develop a fast biofilm formation method for an organic filler during treatment of sewage with a low C/N ratio and thus to speed up the start-up of the reactor.

SUMMARY OF PRESENT INVENTION

The invention solves the technical problem by providing a fast biofilm formation method for an organic filler during treatment of sewage with a low C/N ratio, which can shorten the biofilm culturing time, improve the capacity of resisting impact load and the sewage treatment effect.

To achieve the above objective, the invention provides the following technical solution:

A fast biofilm formation method for an organic filler during treatment of sewage with a low C/N ratio, includes steps of:

(1) adding seed sludge and an organic filler according to a volume ratio of 1:(10-15) into a reactor, aerating for 24 h at a temperature controlled at 50-58° C., and then discharging all of the seed sludge;

(2) dosing anionic polyacrylamide (APAM) and rhamnolipid into sewage, wherein the dosage of APAM is 1-5 mg/L, the dosage of rhamnolipid is 20-30 mg/L, and the dosing manner is directly dosing into the sewage daily;

(3) inoculating a solution of a strain for synthesizing an AI-2 signal molecule with intervals, wherein the volume ratio of the stain solution to the reactor is 1%-3%, the inoculation is performed 2-3 days after the reactor starts running, having an inoculation concentration of 3-5 g/L and SV30 of 18%-30%;

(4) controlling pH at 6.0-8.0, the water temperature at 16-40'C, and the volume load of inlet water at 0.3-1.0 kg COD/($m^3$·d) in the system;

(5) gradually increasing the load of the inlet water according to a proportion of 6%-15% when the removal rate of COD reaches 30%-40% and the removal rate of $NH^{4+}$—N reaches 20%-30%, continuously running for 2-3 days, and then stopping the increase of the inlet-water load; and (6) continually running for 3-18 days to complete the biofilm culturing.

The principle of this method is that rhamnolipid is an anionic biosurfactant generated by microorganisms, which is non-toxic and biodegradable, and by dosing the rhamnolipid the micro-interface action force of the filler is reduced, and it can easily achieve the initial attachment microorganisms on the filler surface, and a trace amount of anionic polyacrylamide (APAM) has a certain flocculation sedimentation function; and on the other hand, autoinducer II is a signal molecule which can plays a role in quorum sensing for both gram negative bacteria and gram-positive bacteria, and thus by adding such a signal molecule the attachment and colonization of microorganisms on the filler surface can be strengthened, thereby achieving fast biofilm formation.

Furthermore, in the aforementioned technical solution, by weight the organic filler described in step (1) essentially consists of 75-85% of polyethylene terephthalate (PET), 0.2-3% of glass powder, 0.5-1.5% of carbon fiber, 0.8-2.0% of volcanic ash, 0.4-1.0% of furnace slag, 0.2-0.5% of porous silica, 0.1-1.0% of day, 0.5-1.0% of kaolin, 0.6-1.0% of grass peat, 0.1-0.3% of pulverized wood, 0.1-0.2% of foaming agent, and the balance of polyvinyl acetal (PVF). The foaming agent is an AC foaming agent, and the carbon fiber is prepared from polyacrylonitrile fiber or polyacrylonitrile-based fiber, and the grass peat is made from carbonized reed and calamus.

Furthermore, in the aforementioned technical solution, the rhamnolipid described in step (2) is a mixed structure of mono-rhamnolipid and di-rhamnolipid, which is of industrial grade and has a concentration of about 25%.

Furthermore, in the aforementioned technical solution, the strain for synthesizing the AI-2 signal molecule is *Acinetobacter* sp. TW.

Furthermore, in the aforementioned technical solution, the *Acinetobacter* sp. TW is inoculated into the reactor with an interval of 2-3 days.

Furthermore, in the aforementioned technical solution, when the removal rates of COD and $NH_4^+$—N respectively reach 70% and 60% stably, an earth-yellow biofilm mainly consisting of protozoa and metazoan is formed on the surface of the filler, then the dosing of APAM, rhamnolipid and the strain for synthesizing the AI-2 signal molecule is stopped to complete the biofilm culturing.

As compared with the prior art, the invention has the following significant effect:

(1) In the invention by dosing a low concentration of rhamnolipid and the bacterial quorum-sensing signal molecule AI-2, the biological attachment and colonization of microorganisms on the filler is accelerated, thereby improving the biofilm culturing effect. As compared with the prior art, in the invention by controlling the dosage of rhamnolipid, the micro-interface acting force of the filler is weakened, and it can achieve the initial attachment of the microorganisms to the surface of the filler easily, and thus the microorganisms grow rapidly on the filler; and dosing the AI-2 with intervals enhances the attachment and colonization of the microorganisms. Since the production of AI-2 by bacteria facilitates interspecific interaction and biofilm formation, and thus the biofilm culturing efficiency of the microorganisms is improved.

(2) As compared with a conventional biofilm culturing method, in the invention the biofilm culturing is rapid and operated conveniently, has strong practicality, and is a fast biofilm formation method for an organic filler, which is adapted for treatment of sewage with a low C/N ratio under an aerobic, anoxic or anaerobic condition.

DETAILED DESCRIPTION OF PREFERRED EMBODIMENTS

To further understand the disclosure of the invention, the invention is further described in connection with the following embodiments.

Example 1

This Example relates to a fast biofilm formation method for an organic filler during treatment of pigment sewage with high ammonia nitrogen and high salinity.

The water quality of the sewage is: a COD concentration of 1200 mg/L, a $NH_4^+$—N concentration of 400 mg/L, a salinity of 1.2%, a pH value of 7, and a water temperature of 20'C.

By weight the organic filler essentially consists of 75% of polyethylene terephthalate (PET), 0.2% of glass powder, 0.5% of carbon fiber, 0.8% of volcanic ash, 0.4% of furnace slag, 0.2% of porous silica, 0.1% of clay, 0.5% of kaolin, 0.6% of grass peat, 0.1% of pulverized wood, 0.1% of foaming agent, and the balance of polyvinyl acetal (PVF). The foaming agent is an AC foaming agent, and the carbon fiber is prepared from polyacrylonitrile fiber, and the grass peat is made from carbonized reed and calamus.

The preparation method of the organic filler is: 1) soaking pulverized wood with a size of 3 mm in a sodium chloride solution having a mass concentration of 0.3% for 1 month, taking it out and drying by baking; 2) mixing the glass powder, clay and kaolin homogeneously and then charging the mixture into a mold, raising the temperature to 300° C. at a heating rate of 3° C./min and then retaining the temperature for 10 min; afterwards raising the temperature to 800° C. at a heating rate of 5° C./min and then retaining the temperature for 250 min; and subsequently cooling to 650° C. at a cooling rate of 10° C./min, and finally cooling to room temperature; 3) mixing the carbon fiber, the volcanic ash, the furnace slag, the porous silica, the straw peat and the glass powder, the clay and the kaolin treated with the step 2) to obtain a premix; 4) heating the premix obtained from step 3) to 250° C. adding the polyethylene terephthalate and polyvinyl acetal into the premix under a condition of continuously stirring at 80 r·min$^{-1}$, and then stirring for 20 min, and subsequently adding the foaming agent to form a mixture; and 5) when the mixture of step 4) is cooled to 75° C., and adding the pulverized wood treated with the step 1) into an extruder barrel to obtain the organic filler by extrusion molding in an extrusion die.

The fast biofilm formation method of this Example is:

(1) adding seed sludge and an organic filler according to a volume ratio of 1:10 into a reactor, aerating for 24 h at a temperature controlled at 50'C, and then discharging all of the seed sludge;

(2) dosing anionic polyacrylamide (APAM) and rhamnolipid into sewage, wherein the dosage of APAM is 1 mg/L, the dosage of rhamnolipid is 20 mg/L, the rhamnolipid is a mixed structure of mono-rhamnolipid and di-rhamnolipid, which is of industrial grade and has a concentration of about 25%, and the dosing manner is directly dosing into the sewage daily;

(3) inoculating a solution of a strain for synthesizing an AI-2 signal molecule with intervals, wherein the strain for synthesizing the AI-2 signal molecule is *Acinetobacter* sp. TW, the volume ratio of the stain solution to the reactor is 1%, the *Acinetobacter* sp. TW is inoculated into the reactor with an interval of 2 days, and the inoculation is performed 2 days after the reactor starts running, having an inoculation concentration of 3 g/L and SV30 of 18%;

(4) controlling pH at 6.0, the water temperature at 16° C., and the volume load of inlet water at 0.3 kg COD/(m$^3$·d) in the system;

(5) gradually increasing the load of the inlet water according to a proportion of 6% when the removal rate of COD reaches 30% and the removal rate of $NH^{4+}$—N reaches 20%, continuously running for 2 days, and then stopping the increase of the inlet-water load; and (6) when the culturing is continually run to day 5, the removal rates of COD and NH4$^+$—N respectively reach 85.9% and 83.7% stably, an earth-yellow biofilm mainly consisting of protozoa and metazoan is formed on the surface of the filler, then stopping the dosing of APAM, rhamnolipid and the strain for synthesizing the AI-2 signal molecule to complete the biofilm culturing, wherein the biofilm culturing efficiency is improved by 45.8%.

Example 2

This Example relates to a fast biofilm formation method for an organic filler during treatment of chemical-industry sewage with high ammonia nitrogen and high salinity.

The water quality of the sewage is: a COD concentration of 1,400 mg/L, a $NH_4^+$—N concentration of 500 mg/L, a salinity of 1%, a pH value of 7.5, and a water temperature of 25° C.

By weight the organic filler essentially consists of 80% of polyethylene terephthalate (PET), 1.6% of glass powder, 1.0% of carbon fiber, 1.4% of volcanic ash, 0.7% of furnace slag, 0.35% of porous silica, 0.55% of clay, 0.75% of kaolin, 0.8% of grass peat, 0.2% of pulverized wood, 0.15% of foaming agent, and the balance of polyvinyl acetal (PVF). The foaming agent is an AC foaming agent, and the carbon fiber is prepared from polyacrylonitrile-based fiber, and the grass peat is made from carbonized reed and calamus.

The preparation method of the organic filler is: 1) soaking pulverized wood with a size of 4 mm in a sodium chloride solution having a mass concentration of 0.65% for 2 month, taking it out and drying by baking; 2) mixing the glass powder, clay and kaolin homogeneously and then charging the mixture into a mold, raising the temperature to 350° C. at a heating rate of 4° C./min and then retaining the temperature for 12.5 min; afterwards raising the temperature to 850° C. at a heating rate of 6.5° C./min and then retaining the temperature for 27.5 min; and subsequently cooling to 675° C. at a cooling rate of 12.5° C./min, and finally cooling to room temperature; 3) mixing the carbon fiber, the volcanic ash, the furnace slag, the porous silica, the straw peat and the glass powder, the clay and the kaolin treated with the step 2) to obtain a premix; 4) heating the premix obtained from step 3) to 265° C., adding the polyethylene terephthalate and polyvinyl acetal into the premix under a condition of continuously stirring at 100 r·min$^{-1}$, and then stirring for 25 min, and subsequently adding the foaming agent to form a mixture; and 5) when the mixture of step 4) is cooled to 77.5° C., and adding the pulverized wood treated with the step 1) into an extruder barrel to obtain the organic filler by extrusion molding in an extrusion die.

The fast biofilm formation method of this Example is:

(1) adding seed sludge and an organic filler according to a volume ratio of 1:12.5 into a reactor, aerating for 24 h at a temperature controlled at 54° C., and then discharging all of the seed sludge;

(2) dosing anionic polyacrylamide (APAM) and rhamnolipid into sewage, wherein the dosage of APAM is 3 mg/L, the dosage of rhamnolipid is 25 mg/L, the rhamnolipid is a mixed structure of mono-rhamnolipid and di-rhamnolipid, which is of industrial grade and has a concentration of about 25%, and the dosing manner is directly dosing into the sewage daily;

(3) inoculating a solution of a strain for synthesizing an AI-2 signal molecule with intervals, wherein the strain for synthesizing the AI-2 signal molecule is *Acinetobacter* sp. TW, the volume ratio of the stain solution to the reactor is 2%, the *Acinetobacter* sp. TW is inoculated into the reactor with an interval of 2 days, and the inoculation is performed 3 days after the reactor starts running, having an inoculation concentration of 4 g/L and SV30 of 24%;

(4) controlling pH at 7.0, the water temperature at 28'C, and the volume load of inlet water at 0.65 kg COD/(m$^3$·d) in the system;

(5) gradually increasing the load of the inlet water according to a proportion of 10.5% when the removal rate of COD reaches 35% and the removal rate of NH$_4^+$—N reaches 25%, continuously running for 2 days, and then stopping the increase of the Inlet-water load; and (6) when the culturing is continually run to day 12, the removal rates of COD and NH$_4^+$—N respectively reach 82.36% and 75.45% stably, an earth-yellow biofilm mainly consisting of protozoa and metazoan is formed on the surface of the filler, then stopping the dosing of APAM, rhamnolipid and the strain for synthesizing the AI-2 signal molecule to complete the biofilm culturing, wherein the biofilm culturing efficiency is improved by 46.2%.

Example 3

This Example relates to a fast biofilm formation method for an organic filler during treatment of pharmaceutical sewage with high ammonia nitrogen.

The water quality of the sewage is: a COD concentration of 400 mg/L, a NH$_4^+$—N concentration of 130 mg/L, a pH value of 8, and a water temperature of 35° C.

By weight the organic filler essentially consists of 85% of polyethylene terephthalate (PET), 3% of glass powder, 1.5% of carbon fiber, 2.0% of volcanic ash, 1.0% of furnace slag, 0.5% of porous silica, 1.0% of clay, 1.0% of kaolin, 1.0% of grass peat, 0.3% of pulverized wood, 0.2% of foaming agent, and the balance of polyvinyl acetal (PVF). The foaming agent is an AC foaming agent, and the carbon fiber is prepared from polyacrylonitrile fiber, and the grass peat is made from carbonized reed and calamus.

The preparation method of the organic filler is: 1) soaking pulverized wood with a size of 5 mm in a sodium chloride solution having a mass concentration of 1% for 3 month, taking it out and drying by baking; 2) mixing the glass powder, clay and kaolin homogeneously and then charging the mixture into a mold, raising the temperature to 400° C. at a heating rate of 5° C./min and then retaining the temperature for 15 min; afterwards raising the temperature to 900° C. at a heating rate of 8° C./min and then retaining the temperature for 30 min; and subsequently cooling to 700° C. at a cooling rate of 15° C./min, and finally cooling to room temperature; 3) mixing the carbon fiber, the volcanic ash, the furnace slag, the porous silica, the straw peat and the glass powder, the day and the kaolin treated with the step 2) to obtain a premix; 4) heating the premix obtained from step 3) to 280° C., adding the polyethylene terephthalate and polyvinyl acetal into the premix under a condition of continuously stirring at 120 r·min$^{-1}$, and then stirring for 30 min, and subsequently adding the foaming agent to form a mixture; and 5) when the mixture of step 4) is cooled to 80° C., and adding the pulverized wood treated with the step 1) into an extruder barrel to obtain the organic filler by extrusion molding in an extrusion die.

The fast biofilm formation method of this Example is:

(1) adding seed sludge and an organic filler according to a volume ratio of 1:15 into a reactor, aerating for 24 h at a temperature controlled at 58° C., and then discharging all of the seed sludge;

(2) dosing anionic polyacrylamide (APAM) and rhamnolipid into sewage, wherein the dosage of APAM is 5 mg/L, the dosage of rhamnolipid is 30 mg/L, the rhamnolipid is a mixed structure of mono-rhamnolipid and di-rhamnolipid, which is of industrial grade and has a concentration of about 25%, and the dosing manner is directly dosing into the sewage daily;

(3) inoculating a solution of a strain for synthesizing an AI-2 signal molecule with intervals, wherein the strain for synthesizing the AI-2 signal molecule is *Acinetobacter* sp. TW, the volume ratio of the stain solution to the reactor is 3%, the *Acinetobacter* sp. TW is inoculated into the reactor with an interval of 3 days, and the inoculation is performed 3 days after the reactor starts running, having an inoculation concentration of 5 g/L and SV30 of 30%;

(4) controlling pH at 8.0, the water temperature at 40° C., and the volume load of inlet water at 1.0 kg COD/(m$^3$·d) in the system;

(5) gradually increasing the load of the inlet water according to a proportion of 15% when the removal rate of COD reaches 40% and the removal rate of $NH_4^+$—N reaches 30%, continuously running for 3 days, and then stopping the increase of the inlet-water load;

(6) when the culturing is continually run to day 18, the removal rates of COD and $NH_4^+$—NN respectively reach 90% and 93.4% stably, an earth-yellow biofilm mainly consisting of protozoa and metazoan is formed on the surface of the filler, then stopping the dosing of APAM, rhamnolipid and the strain for synthesizing the AI-2 signal molecule to complete the biofilm culturing, wherein the biofilm culturing efficiency is improved by 42.9%.

The aforementioned descriptions are only preferred embodiments of the invention, and is not intended to limit the invention in other forms. Any person skilled in the art can change or modify the technical content disclosed as above to equivalent embodiments having equivalent changes. However, without departing from the disclosure of the invention, any simple change, equivalent alternation and modification to the aforementioned embodiments based on the technical substance of the invention still fall within the scope of the invention.

We claim:

1. A biofilm formation method for an organic filler during treatment of sewage, comprising steps of:
   (1) adding seed sludge and an organic filler according to a volume ratio of 1:(10-15) into a reactor, aerating for 24 h at a temperature controlled at 50-58° C., and then discharging all of the seed sludge;
   (2) dosing anionic polyacrylamide (APAM) and rhamnolipid into sewage, wherein the dosage of APAM is 1-5 mg/L, the dosage of rhamnolipid is 20-30 mg/L, and the dosing manner is directly dosing into the sewage daily;
   (3) inoculating a solution of a bacterial strain of *Acinetobacter* sp. TW for synthesizing an autoinducer-2 (AI-2) signal molecule, wherein the volume ratio of the strain solution to the reactor is 1%-3%, the inoculation is performed 2-3 days after the reactor starts running, having an inoculation concentration of 3-5 g/L and SV30 of 18%-30%;
   (4) controlling pH at 6.0-8.0, the water temperature at 16-40° C., and the volume load of inlet water at 0.3-1.0 kg COD/($m^3$·day) in the system;
   (5) gradually increasing the load of the inlet water according to a proportion of 6%-15% when a removal rate of COD reaches 30%-40% and a removal rate of $NH_4^+$—N reaches 20%-30%, continuously running for 2-3 days, and then stopping the increase of the inlet-water load; and
   (6) continually running for 3-18 days.

2. The biofilm formation method for an organic filler during treatment of sewage of claim 1, wherein the rhamnolipid of step (2) is a mixed structure of mono-rhamnolipid and di-rhamnolipid.

3. The biofilm formation method for an organic filler during treatment of sewage of claim 1, wherein when the removal rates of COD and $NH_4^+$—N respectively reach 70% and 60% stably, a biofilm mainly consisting of protozoa and metazoan is formed on the surface of the filler, then the dosing of APAM, rhamnolipid and the strain for synthesizing the AI-2 signal molecule is stopped to complete the biofilm culturing.

* * * * *